(12) United States Patent
Fujii et al.

(10) Patent No.: US 11,441,670 B2
(45) Date of Patent: Sep. 13, 2022

(54) HYDRAULIC SUPPLY SYSTEM

(71) Applicant: TOYOTA JIDOSHA KABUSHIKI KAISHA, Toyota (JP)

(72) Inventors: Kota Fujii, Nisshin (JP); Yuki Makino, Aichi-gun (JP); Toshiaki Tamachi, Seto (JP); Koji Hayashi, Nagakute (JP); Tooru Matsubara, Toyota (JP); Ken Fujimoto, Ichinomiya (JP); Masato Nakano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 17/034,761

(22) Filed: Sep. 28, 2020

(65) Prior Publication Data

US 2021/0222768 A1 Jul. 22, 2021

(30) Foreign Application Priority Data

Jan. 16, 2020 (JP) .............................. JP2020-005504

(51) Int. Cl.
*F16H 61/662* (2006.01)
*F16H 57/04* (2010.01)
(Continued)

(52) U.S. Cl.
CPC ..... *F16H 57/0435* (2013.01); *F16H 57/0436* (2013.01); *F16H 57/0446* (2013.01);
(Continued)

(58) Field of Classification Search
CPC ............. F16H 61/0031; F16H 61/4008; F16H 61/0262; F16H 57/0435; F16H 57/0436;
(Continued)

(56) References Cited

U.S. PATENT DOCUMENTS 6,991,581 B2 * 1/2006 Murakami ............. B60K 6/547 477/3
2007/0284176 A1 * 12/2007 Sah ........................ B60K 6/547 180/305

(Continued)

FOREIGN PATENT DOCUMENTS

CN 102556049 A 7/2012
JP 2012-097813 A 5/2012

*Primary Examiner* — Timothy Hannon
*Assistant Examiner* — Farhana Pervin
(74) *Attorney, Agent, or Firm* — Oliff PLC

(57) ABSTRACT

Because an EOP starts operating from when a decrease in discharge flow rate of an MOP is predicted or detected, a PL actual pressure that should be obtained with a PL command pressure set to a value for a required transmission torque is more easily maintained even when the discharge flow rate of the MOP becomes insufficient. After a lapse of a predetermined period of time from the start of operation of the EOP, the PL command pressure is temporarily set to a value higher than the value for the required transmission torque, and a regulator valve is controlled to operate to close a drain port. Therefore, the operation of the EOP in a high PL actual pressure is reduced, and a delay in response of a pressure regulating operation of the regulator valve in the process of reduction of the discharge flow rate of the MOP is reduced.

7 Claims, 5 Drawing Sheets

(51) Int. Cl.
  *F16H 61/00* (2006.01)
  *F16H 61/4008* (2010.01)
  *F16H 61/02* (2006.01)

(52) U.S. Cl.
  CPC ..... *F16H 61/0031* (2013.01); *F16H 61/4008* (2013.01); *F16H 61/0262* (2013.01)

(58) Field of Classification Search
  CPC ............ F16H 57/0446; F16H 57/0439; F16H 2061/0037; F16H 2061/0255
  See application file for complete search history.

(56) References Cited

U.S. PATENT DOCUMENTS

| | | | |
|---|---|---|---|
| 2010/0241326 A1* | 9/2010 | Muranaka | F16H 61/0031 701/58 |
| 2011/0224879 A1* | 9/2011 | Waku | F16H 61/0031 701/67 |
| 2012/0103709 A1* | 5/2012 | Mochiyama | F16H 61/0025 180/65.21 |
| 2016/0369856 A1* | 12/2016 | Kimura | F16D 48/062 |
| 2018/0119800 A1* | 5/2018 | Shimizu | B60W 20/00 |
| 2019/0048997 A1* | 2/2019 | Harada | H02P 29/68 |
| 2021/0140536 A1* | 5/2021 | Nakasone | F16H 61/0009 |

\* cited by examiner

| AT GEAR STAGE | C1 | C2 | B1 | B2 | F1 |
|---|---|---|---|---|---|
| 1st | ENGAGED | | | ENGAGED IN PREDETERMINED CONDITION | ENGAGED |
| 2nd | ENGAGED | | ENGAGED | | |
| 3rd | ENGAGED | ENGAGED | | | |
| 4th | | ENGAGED | ENGAGED | | |
| Rev | ENGAGED | | | ENGAGED | |

C1,C2,B1,B2
CB

HYDRAULIC SUPPLY SYSTEM

CROSS-REFERENCE TO RELATED APPLICATION

This application claims priority to Japanese Patent Application No. 2020-005504 filed on Jan. 16, 2020, incorporated herein by reference in its entirety.

BACKGROUND

1. Technical Field

The present disclosure relates to a hydraulic supply system including multiple oil pumps, a pressure regulating valve, and a controller.

2. Description of Related Art

There is a well-known hydraulic supply system including a first oil pump, a second oil pump of which the operation status is controllable, a pressure regulating valve that regulates a line pressure by opening a drain port to reduce the hydraulic pressure of hydraulic fluid, discharged from the first oil pump and the second oil pump, in accordance with a hydraulic pressure command value, and a controller that controls the operation status of the second oil pump, that controls a pressure regulating operation of the pressure regulating valve by setting the hydraulic pressure command value, and that adjusts a torque capacity of a hydraulic engagement device by using the line pressure as a source pressure. This is, for example, a hybrid vehicle described in Japanese Unexamined Patent Application Publication No. 2012-097813 (JP 2012-097813 A). JP 2012-097813 A describes that, when it is detected that the hydraulic pressure of hydraulic fluid discharged from a mechanical oil pump serving as a first oil pump is lower than a required line pressure, the operation of an electric oil pump serving as a second oil pump is started, and a hydraulic pressure command value for a pressure regulating valve is set to a value obtained by adding a predetermined additional correction amount to the required line pressure in synchronization with the start of operation of the electric oil pump.

SUMMARY

Incidentally, a hydraulic pressure command value for the pressure regulating valve is set to a value for a required transmission torque of a hydraulic engagement device in order to improve fuel efficiency. On the other hand, when, for example, a request to transition into a vehicle state where the operation of the first oil pump is stopped is made, the flow rate of hydraulic fluid discharged from the first oil pump reduces. When the discharge flow rate of the first oil pump becomes insufficient and, as a result, it is not possible to maintain a line pressure that should be obtained with a set hydraulic pressure command value, the torque capacity of the hydraulic engagement device becomes insufficient for a required transmission torque, and a slip occurs in the hydraulic engagement device. For this reason, it is desirable to start the operation of the second oil pump before the torque capacity of the hydraulic engagement device becomes insufficient for the required transmission torque, that is, when a decrease in the discharge flow rate of the first oil pump is predicted or when a decrease in the discharge flow rate of the first oil pump is detected. On the other hand, the pressure regulating valve performs pressure regulating operation to regulate the hydraulic pressure of hydraulic fluid supplied to the pressure regulating valve to a hydraulic pressure for a hydraulic pressure command value; however, it may be difficult to operate to close a drain port commensurately with a transitional reduction in the flow rate of hydraulic fluid to be supplied because of a delay in response of the pressure regulating operation. Therefore, even when the operation of the second oil pump is started before the torque capacity of the hydraulic engagement device becomes insufficient for the required transmission torque, that is, even when the flow rate of hydraulic fluid to be supplied is not insufficient, it may be difficult to maintain a line pressure that should be obtained with a set hydraulic pressure command value in the process of reduction of the discharge flow rate of hydraulic fluid from the first oil pump. By referring to JP 2012-097813 A, it is conceivable to facilitate the operation to close a drain port by setting the hydraulic pressure command value for the pressure regulating valve to a value temporarily higher than the value for the required transmission torque in synchronization with the start of operation of the second oil pump. However, in this case, the second oil pump is operated in a high line pressure, and there are concerns that the durability of the second oil pump deteriorates.

The present disclosure provides a hydraulic supply system that is capable of suppressing a decrease in line pressure in the process of reduction of a flow rate of hydraulic fluid discharged from a first oil pump while minimizing the deterioration of the durability of a second oil pump.

An aspect of the present disclosure relates to a hydraulic supply system. The hydraulic supply system includes a first oil pump, a second oil pump of which an operation status is controllable, a pressure regulating valve configured to regulate a line pressure by opening a drain port to reduce a hydraulic pressure of hydraulic fluid, discharged from the first oil pump and the second oil pump, in accordance with a hydraulic pressure command value, and a controller configured to control the operation status of the second oil pump, control a pressure regulating operation of the pressure regulating valve by setting the hydraulic pressure command value, and adjust a torque capacity of a hydraulic engagement device by using the line pressure as a source pressure. The controller is configured to set the hydraulic pressure command value to a value for a required transmission torque of the hydraulic engagement device, and is configured to start an operation of the second oil pump from when a decrease in discharge flow rate of the first oil pump is predicted or when a decrease in the discharge flow rate of the first oil pump is detected and control the pressure regulating valve such that the pressure regulating valve operates to close the drain port by, after a lapse of a predetermined period of time, with which the line pressure becomes lower than a predetermined pressure, from when the operation of the second oil pump is started, temporarily setting the hydraulic pressure command value to a value higher than the value for the required transmission torque.

In the hydraulic supply system according to the aspect of the present disclosure, the predetermined pressure may be a line pressure that is obtained with the hydraulic pressure command value set to the value for the required transmission torque, or an upper limit of a line pressure, determined in advance to reduce deterioration of durability of the second oil pump.

In the hydraulic supply system according to the aspect of the present disclosure, the controller may be configured to set the predetermined period of time in accordance with a degree of decrease in the line pressure from when the line pressure that has been temporarily in an increasing tendency after the operation of the second oil pump is started switches to a decreasing tendency, and the controller may be configured to shorten the predetermined period of time when the degree of decrease in the line pressure is high as compared to when the degree of decrease in the line pressure is low.

In the hydraulic supply system according to the aspect of the present disclosure, the controller may be configured to set the predetermined period of time in accordance with a temperature of the hydraulic fluid.

In the hydraulic supply system according to the aspect of the present disclosure, the controller may be configured to set the predetermined period of time in accordance with a degree of decrease in the discharge flow rate of the first oil pump from when the operation of the second oil pump is started, and the controller may be configured to shorten the predetermined period of time when the degree of decrease in the discharge flow rate is high as compared to when the degree of decrease in the discharge flow rate is low.

In the hydraulic supply system according to the aspect of the present disclosure, the controller may be configured to, after a lapse of the predetermined period of time from when the operation of the second oil pump is started, set the hydraulic pressure command value to a predetermined value higher than the value for the required transmission torque and then gradually reduce the hydraulic pressure command value from the predetermined value to the value for the required transmission torque.

In the hydraulic supply system according to the aspect of the present disclosure, the predetermined value may be a value determined in advance to make the line pressure more difficult to decrease than a line pressure that is obtained with the hydraulic pressure command value set to the value for the required transmission torque.

According to the aspect of the present disclosure, the operation of the second oil pump is started when a decrease in the discharge flow rate of the first oil pump is predicted or detected. Therefore, even when the discharge flow rate of the first oil pump becomes insufficient, a line pressure that should be obtained with the hydraulic pressure command value set to the value for the required transmission torque of the hydraulic engagement device is more easily maintained. After a lapse of the predetermined period of time, with which the line pressure becomes lower than the predetermined pressure, from when the operation of the second oil pump is started, the hydraulic pressure command value is temporarily set to a value higher than the value for the required transmission torque, and the pressure regulating valve is controlled so as to operate to close the drain port. Therefore, the operation of the second oil pump in a high line pressure is reduced, and a delay in response of the pressure regulating operation of the pressure regulating valve in the process of reduction of the flow rate of hydraulic fluid discharged from the first oil pump is reduced. Thus, it is possible to suppress a decrease in line pressure in the process of reduction of the flow rate of hydraulic fluid discharged from the first oil pump while minimizing the deterioration of the durability of the second oil pump.

According to the aspect of the present disclosure, the predetermined pressure is a line pressure that is obtained with the hydraulic pressure command value set to the value for the required transmission torque, or an upper limit of a line pressure, determined in advance to minimize the deterioration of the durability of the second oil pump. Therefore, the operation of the second oil pump in a high line pressure is appropriately reduced, and a delay in response of the pressure regulating operation of the pressure regulating valve in the process of reduction of the flow rate of hydraulic fluid discharged from the first oil pump is appropriately reduced.

According to the aspect of the present disclosure, the predetermined period of time is shortened when the degree of decrease in line pressure from when the line pressure that has been temporarily in an increasing tendency switches to a decreasing tendency after the operation of the second oil pump is started is high as compared to when the degree of decrease in line pressure is low. Therefore, even when the degree of decrease in line pressure from when the operation of the second oil pump is started varies, the hydraulic pressure command value is more easily temporarily set to a higher value when the line pressure is made lower than the predetermined pressure. Thus, the operation of the second oil pump in a high line pressure is appropriately reduced, and a delay in response of the pressure regulating operation of the pressure regulating valve in the process of reduction of the flow rate of hydraulic fluid discharged from the first oil pump is appropriately reduced.

According to the aspect of the present disclosure, the predetermined period of time is set in accordance with a temperature of hydraulic fluid. Therefore, even when the response of the pressure regulating operation of the pressure regulating valve and the rate of drain of hydraulic fluid from the drain port change depending on a difference in the temperature of hydraulic fluid and, as a result, the degree of decrease in line pressure from when the operation of the second oil pump is started varies, the hydraulic pressure command value is more easily temporarily set to a higher value when the line pressure is made lower than the predetermined pressure. Thus, the operation of the second oil pump in a high line pressure is appropriately reduced, and a delay in response of the pressure regulating operation of the pressure regulating valve in the process of reduction of the flow rate of hydraulic fluid discharged from the first oil pump is appropriately reduced.

According to the aspect of the present disclosure, the predetermined period of time is shortened when the degree of decrease in the discharge flow rate of the first oil pump from when the operation of the second oil pump is started is high as compared to when the degree of decrease in the discharge flow rate is low. Therefore, even when the degree of decrease in line pressure from when the operation of the second oil pump is started varies depending on a difference in the degree of decrease in the discharge flow rate of the first oil pump, the hydraulic pressure command value is more easily temporarily set to a higher value when the line pressure is made lower than the predetermined pressure. Thus, the operation of the second oil pump in a high line pressure is appropriately reduced, and a delay in response of the pressure regulating operation of the pressure regulating valve in the process of reduction of the flow rate of hydraulic fluid discharged from the first oil pump is appropriately reduced.

According to the aspect of the present disclosure, after a lapse of the predetermined period of time from when the operation of the second oil pump is started, the hydraulic pressure command value is set to a predetermined value higher than the value for the required transmission torque, and then the hydraulic pressure command value is gradually reduced from the predetermined value to the value for the required transmission torque. Therefore, a delay in response of the pressure regulating operation of the pressure regulating valve in the process of reduction of the flow rate of hydraulic fluid discharged from the first oil pump is appropriately reduced, and the operation of the second oil pump in a high line pressure is appropriately reduced.

According to the aspect of the present disclosure, the predetermined value is a value determined in advance to make the line pressure more difficult to decrease than a line pressure that is obtained with the hydraulic pressure command value set to the value for the required transmission torque. Therefore, a decrease in line pressure in the process of reduction of the flow rate of hydraulic fluid discharged from the first oil pump is appropriately reduced.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the accompanying drawings.

Figure 1:
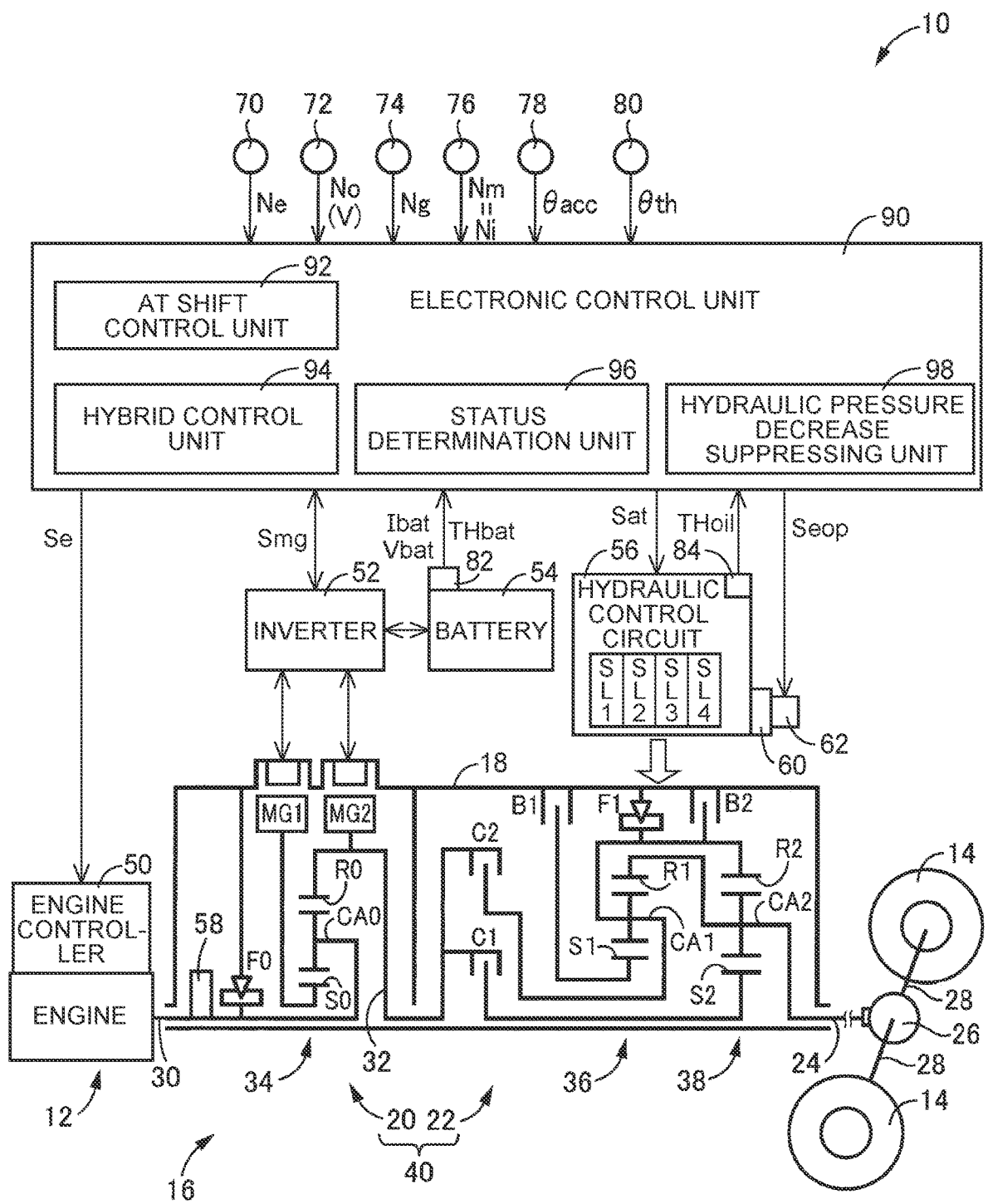
FIG. 1 is a diagram that illustrates the schematic configuration of a vehicle to which the present disclosure is applied and is a diagram that illustrates a relevant part of control functions and control system for various control in the vehicle.

FIG. 1 is a diagram that illustrates the schematic configuration of a vehicle 10 to which the present disclosure is applied and is a diagram that illustrates a relevant part of a control system for various control in the vehicle 10. As shown in FIG. 1, the vehicle 10 is a hybrid vehicle including an engine 12, a first rotating machine MG1, and a second rotating machine MG2. The vehicle 10 includes drive wheels 14, and a powertrain 16 provided in a power transmission path between the engine 12 and the drive wheels 14.

The engine 12 is a power source of the vehicle 10 and is a known internal combustion engine, such as a gasoline engine and a diesel engine. An electronic control unit 90 (described later) controls an engine controller 50 to control an engine torque Te that is an output torque of the engine 12. The engine controller 50 includes a throttle actuator, a fuel injection device, an ignition device, and the like provided in the vehicle 10.

Each of the first rotating machine MG1 and the second rotating machine MG2 is a rotating electrical machine that functions as an electric motor (motor) and also functions as a generator and is a so-called motor generator. Each of the first rotating machine MG1 and the second rotating machine MG2 can be a power source for propelling the vehicle 10. Each of the first rotating machine MG1 and the second rotating machine MG2 is connected to a battery 54 provided in the vehicle 10 via an inverter 52 provided in the vehicle 10. The electronic control unit 90 (described later) controls the inverter 52 to control an MG1 torque Tg that is an output torque of the first rotating machine MG1 and an MG2 torque Tm that is an output torque of the second rotating machine MG2. An output torque of each rotating machine is a power running torque in an accelerating positive torque in, for example, forward rotation and is a regenerative torque in a decelerating negative torque. The battery 54 is an electrical storage device that exchanges electric power with each of the first rotating machine MG1 and the second rotating machine MG2. The first rotating machine MG1 and the second rotating machine MG2 are provided inside a case 18 that is a non-rotating member connected to a vehicle body.

The powertrain 16 includes an electrical continuously variable transmission unit 20, a mechanical step transmission unit 22, and the like disposed in series along a common axis inside the case 18. The electrical continuously variable transmission unit 20 is coupled to the engine 12 directly or indirectly via a damper or the like (not shown). The mechanical step transmission unit 22 is coupled to an output side of the electrical continuously variable transmission unit 20. The powertrain 16 includes a differential gear unit 26, axles 28, and the like. The differential gear unit 26 is coupled to an output shaft 24 that is an output rotating member of the mechanical step transmission unit 22. The axles 28 are coupled to the differential gear unit 26. In the powertrain 16, a power output from the engine 12 or the second rotating machine MG2 or both is transmitted to the mechanical step transmission unit 22 and is further transmitted from the mechanical step transmission unit 22 to the drive wheels 14 via the differential gear unit 26 and the like. Hereinafter, the electrical continuously variable transmission unit 20 is referred to as continuously variable transmission unit 20, and the mechanical step transmission unit 22 is referred to as step transmission unit 22. Power is synonymous with torque and force unless otherwise distinguished. The continuously variable transmission unit 20, the step transmission unit 22, and the like are substantially symmetrical with respect to the common axis and the lower half below the axis is omitted in FIG. 1. The common axis is an axis of a crankshaft of the engine 12, a coupling shaft 30 coupled to the crankshaft, or the like.

The continuously variable transmission unit 20 includes the first rotating machine MG1 and a differential mechanism 34. The differential mechanism 34 mechanically distributes the power of the engine 12 between the first rotating machine MG1 and an intermediate transmission member 32 that is an output rotating member of the continuously variable transmission unit 20. The second rotating machine MG2 is coupled to the intermediate transmission member 32 such that power can be transmitted. The continuously variable transmission unit 20 is an electrical continuously variable transmission in which the operating status of the first rotating machine MG1 is controlled to control a differential state of the differential mechanism 34. Controlling the operating status of the first rotating machine MG1 is controlling the operation of the first rotating machine MG1.

The differential mechanism 34 is a single-pinion planetary gear train and includes a sun gear S0, a carrier CA0, and a ring gear R0. The engine 12 is coupled to the carrier CA0 via the coupling shaft 30 such that power can be transmitted. The first rotating machine MG1 is coupled to the sun gear S0 such that power can be transmitted. The second rotating machine MG2 is coupled to the ring gear R0 such that power can be transmitted. In the differential mechanism 34, the carrier CA0 functions as an input element, the sun gear S0 functions as a reaction element, and the ring gear R0 functions as an output element.

The step transmission unit 22 is a mechanical transmission mechanism serving as a step transmission unit that makes up part of a power transmission path between the intermediate transmission member 32 and the drive wheels 14, that is, part of a power transmission path between the continuously variable transmission unit 20 and the drive wheels 14. The intermediate transmission member 32 also functions as an input rotating member of the step transmission unit 22. The second rotating machine MG2 is coupled to the intermediate transmission member 32 so as to rotate integrally with the intermediate transmission member 32. The step transmission unit 22 is a known planetary gear automatic transmission including, for example, multiple sets of planetary gear trains and multiple engagement devices. The multiple sets of planetary gear trains include a first planetary gear train 36 and a second planetary gear train 38. The multiple engagement devices include a clutch C1, a clutch C2, a brake B1, a brake B2, and a one-way clutch F1. Hereinafter, the clutch C1, the clutch C2, the brake B1, and the brake B2 are simply referred to as engagement devices CB unless otherwise distinguished.

Each of the engagement devices CB is a hydraulic frictional engagement device that is a multiple disc or single disc clutch or brake that is pressed by a hydraulic actuator, a band brake that is fastened by a hydraulic actuator, or the like. In other words, the engagement devices CB are hydraulic engagement devices. An operation status, which is an engaged state, a released state, or the like, of each of the engagement devices CB is changed by changing an engagement torque Tcb that is a torque capacity by using a regulated engagement hydraulic pressure PRcb for the engagement device CB. The engagement hydraulic pressures PRcb are hydraulic pressures Pc1, Pc2, Pb1, Pb2 (see FIG. 4 (described later)) of the engagement devices CB, which are respectively output from solenoid valves SL1, SL2, SL3, SL4, and the like in a hydraulic control circuit 56 provided in the vehicle 10. To transmit, for example, an AT input torque Ti, which is an input torque to be input to the step transmission unit 22, between the intermediate transmission member 32 and the output shaft 24 without a slip of the engagement devices CB, an engagement torque Tcb that provides a transmission torque that each of the engagement devices CB needs to bear for the AT input torque Ti is required. Not causing each engagement device CB to slip requires not causing a differential rotation speed in the engagement device CB. A transmission torque that each of the engagement devices CB needs to bear is a torque assigned to the engagement device CB and, in the present embodiment, referred to as required transmission torque Tcbn. An engagement torque Tcb and an engagement hydraulic pressure PRcb are substantially in a proportional relationship except for, for example, a region in which an engagement hydraulic pressure PRcb required to pack each engagement device CB is supplied.

In the step transmission unit 22, the rotating elements of the first planetary gear train 36 and the second planetary gear train 38 are partially coupled to each other or coupled to the intermediate transmission member 32, the case 18, or the output shaft 24 directly or indirectly via the engagement device CB or the one-way clutch F1. The rotating elements of the first planetary gear train 36 are a sun gear S1, a carrier CA1, and a ring gear R1. The rotating elements of the second planetary gear train 38 are a sun gear S2, a carrier CA2, and a ring gear R2.

The step transmission unit 22 is a step transmission unit in which any one of multiple speed stages (also referred to as gear stages) having different speed ratios (also referred to as gear ratios) γat (=AT input rotation speed Ni/Output rotation speed No) is established by engaging, for example, predetermined engagement devices each are any one of the multiple engagement devices. In other words, the gear stage of the step transmission unit 22 is changed, that is, the step transmission unit 22 is shifted, by engaging any two of the multiple engagement devices. The step transmission unit 22 is a step automatic transmission in which each of multiple gear stages is established. In the present embodiment, gear stages that are established in the step transmission unit 22 are referred to as AT gear stages. The AT input rotation speed Ni is the input rotation speed of the step transmission unit 22, which is the rotation speed of the input rotating member of the step transmission unit 22. The AT input rotation speed Ni is equal to the rotation speed of the intermediate transmission member 32 and is equal to an MG2 rotation speed Nm that is the rotation speed of the second rotating machine MG2. The AT input rotation speed Ni can be expressed by using the MG2 rotation speed Nm. The output rotation speed No is the rotation speed of the output shaft 24, which is the output rotation speed of the step transmission unit 22, and is also the output rotation speed of a combined transmission 40 that is an overall transmission including the continuously variable transmission unit 20 and the step transmission unit 22. The combined transmission 40 is a transmission that is part of the power transmission path between the engine 12 and the drive wheels 14.

Figures 2, 3:
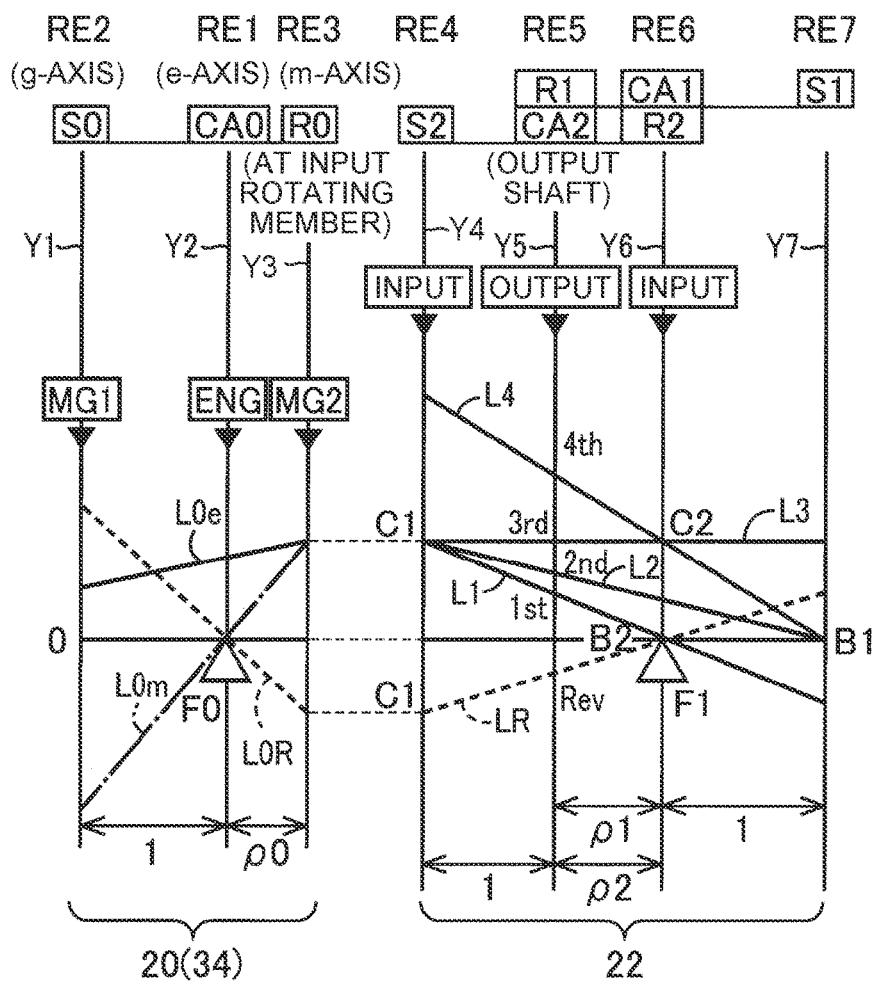
FIG. 2 is an operation chart that illustrates a relationship between a shift operation of a mechanical step transmission unit illustrated in FIG. 1 and a combination of operations of engagement devices to be used for the shift operation.
FIG. 3 is a nomograph that shows a relative relationship in rotation speed among rotating elements in an electrical continuously variable transmission unit and the mechanical step transmission unit.

In the step transmission unit 22, for example, as shown in the engagement operation chart of FIG. 2, four forward AT gear stages, that is, an AT first gear stage ("1st" in the chart), an AT second gear stage ("2nd" in the chart), an AT third gear stage ("3rd" in the chart), and an AT fourth gear stage ("4th" in the chart), are established as the multiple AT gear stages. The speed ratio γat of the AT first gear stage is the largest, and the speed ratio γat reduces as the AT gear stage becomes higher. A reverse AT gear stage ("Rev" in the chart) is established by, for example, engaging the clutch C1 and engaging the brake B2. In other words, as will be described later, when the vehicle 10 moves backward, for example, the AT first gear stage is established. The engagement operation chart of FIG. 2 summarizes the relationship between each AT gear stage and the operation statuses of the multiple engagement devices. In other words, the engagement operation chart of FIG. 2 summarizes the relationship between each AT gear stage and predetermined engagement devices that are engaged in the AT gear stage. In FIG. 2, "ENGAGED" denotes an engaged state, "ENGAGED UNDER PREDETERMINED CONDITIONS" denotes an engaged state during engine braking or during coast downshift of the step transmission unit 22, and blank denotes a released state.

In the step transmission unit 22, the electronic control unit 90 (described later) changes an AT gear stage to be established, that is, selectively establishes any one of multiple AT gear stages, in accordance with an accelerator operation of a driver, a vehicle speed, and the like. For example, in shift control over the step transmission unit 22, so-called clutch-to-clutch shift, in which shift is performed by changing one of engaged engagement devices of the engagement devices CB, that is, shift is performed by switching one of engaged engagement devices and one of released engagement devices of the engagement devices CB.

The vehicle 10 further includes a one-way clutch F0, an MOP 58 that is a mechanical oil pump, an EOP 60 that is an electric oil pump, and the like.

The one-way clutch F0 is a lock mechanism that is capable of locking the carrier CA0 such that the carrier CA0 does not rotate. In other words, the one-way clutch F0 is a lock mechanism that is capable of locking the coupling shaft 30, which is coupled to the crankshaft of the engine 12 and which integrally rotates with the carrier CA0, to the case 18. The one-way clutch F0 includes two relatively rotatable members. One of the two members is integrally coupled to the coupling shaft 30, and the other member is integrally coupled to the case 18. The one-way clutch F0 idles when rotated in a forward rotation direction that is a rotation direction during the operation of the engine 12 and is automatically engaged when rotated in a rotation direction opposite to the rotation direction during the operation of the engine 12. Therefore, when the one-way clutch F0 idles, the engine 12 is rotatable relative to the case 18. On the other hand, when the one-way clutch F0 is engaged, the engine 12 is not rotatable relative to the case 18. In other words, by the engagement of the one-way clutch F0, the engine 12 is locked to the case 18. In this way, the one-way clutch F0 allows the rotation of the carrier CA0 in a forward rotation direction that is the rotation direction during the operation of the engine 12 and stops the rotation of the carrier CA0 in a reverse rotation direction. In other words, the one-way clutch F0 is a lock mechanism that is capable of allowing the rotation of the engine 12 in the forward rotation direction and stopping the rotation in the reverse rotation direction.

The MOP 58 is coupled to the coupling shaft 30. The MOP 58 is rotated with the rotation of the engine 12 to discharge hydraulic fluid OIL that is used in the powertrain 16. The MOP 58 is rotated by, for example, the engine 12 to discharge hydraulic fluid OIL. The EOP 60 is rotated by an oil pump-dedicated motor 62 provided in the vehicle 10 to discharge hydraulic fluid OIL. Hydraulic fluid OIL discharged from the MOP 58 or the EOP 60 is supplied to the hydraulic control circuit 56 (see FIG. 4 (described later)). The operation statuses of the engagement devices CB are respectively changed by using the hydraulic pressures Pc1, Pc2, Pb1, Pb2 regulated from the hydraulic fluid OIL as a source by the hydraulic control circuit 56. The MOP 58 is a first oil pump having a higher capacity and a higher load than the EOP 60. The EOP 60 is a second oil pump having a lower capacity and a lower load than the MOP 58 and is operated in, for example, EV drive mode. The EV drive mode is a drive mode that is established when a required driving power Prdem is less than that in HV drive mode, as will be described later. Of the first oil pump and the second oil pump, at least the second oil pump is an oil pump of which the operation status that is an operating state or a stopped state is controllable by the electronic control unit 90 (described later).

FIG. 3 is a nomograph that shows the relative relationship in rotation speed among the rotating elements of the continuously variable transmission unit 20 and the step transmission unit 22. In FIG. 3, the three vertical lines Y1, Y2, Y3 corresponding to the three rotating elements of the differential mechanism 34 that is a component of the continuously variable transmission unit 20 are respectively a g-axis that represents the rotation speed of the sun gear S0 corresponding to a second rotating element RE2, an e-axis that represents the rotation speed of the carrier CA0 corresponding to a first rotating element RE1, and an m-axis that represents the rotation speed of the ring gear R0 corresponding to a third rotating element RE3 (that is, the input rotation speed of the step transmission unit 22) in order from the left side. The four vertical lines Y4, Y5, Y6, Y7 for the step transmission unit 22 are respectively axes that respectively represent the rotation speed of the sun gear S2 corresponding to a fourth rotating element RE4, the rotation speed of the mutually coupled ring gear R1 and carrier CA2, corresponding to a fifth rotating element RE5 (that is, the rotation speed of the output shaft 24), the rotation speed of the mutually coupled carrier CA1 and ring gear R2, corresponding to a sixth rotating element RE6, and the rotation speed of the sun gear S1 corresponding to a seventh rotating element RE7 in order from the left side. The intervals between the vertical lines Y1, Y2, Y3 are determined in accordance with the gear ratio ρ0 of the differential mechanism 34. The intervals between the vertical lines Y4, Y5, Y6, Y7 are determined in accordance with the gear ratio ρ1 of the first planetary gear train 36 and the gear ratio ρ2 of the second planetary gear train 38. In the relationship among the vertical lines of the nomograph, when the interval between the sun gear and the carrier is assumed as an interval corresponding to one, the interval between the carrier and the ring gear is an interval corresponding to the gear ratio ρ (=Number of teeth of the sun gear/Number of teeth of the ring gear) of the planetary gear train.

When expressed by using the nomograph of FIG. 3, in the differential mechanism 34 of the continuously variable transmission unit 20, the engine 12 (see "ENG" in the nomograph) is coupled to the first rotating element RE1, the first rotating machine MG1 (see "MG1" in the nomograph) is coupled to the second rotating element RE2, the second rotating machine MG2 (see "MG2" in the nomograph) is coupled to the third rotating element RE3 that rotates integrally with the intermediate transmission member 32, and the continuously variable transmission unit 20 is configured to transmit the rotation of the engine 12 to the step transmission unit 22 via the intermediate transmission member 32. In the continuously variable transmission unit 20, the lines L0e, L0m, L0R that cross the vertical line Y2 each indicate the relationship between the rotation speed of the sun gear S0 and the rotation speed of the ring gear R0.

In the step transmission unit 22, the fourth rotating element RE4 is selectively coupled to the intermediate transmission member 32 via the clutch C1, the fifth rotating element RE5 is coupled to the output shaft 24, the sixth rotating element RE6 is selectively coupled to the intermediate transmission member 32 via the clutch C2 and selectively coupled to the case 18 via the brake B2, and the seventh rotating element RE7 is selectively coupled to the case 18 via the brake B1. In the step transmission unit 22, through engagement and release control over the engagement devices CB, the lines L1, L2, L3, L4, LR that cross the vertical line Y5 respectively indicate the rotation speeds of "1st", "2nd", "3rd", "4th", and "Rev" in the output shaft 24.

The line L0*e* and the lines L1, L2, L3, L4, represented by the continuous lines in FIG. 3, respectively indicate the relative speeds of the rotating elements in forward running in HV drive mode in which the vehicle 10 is able to perform hybrid driving (=HV driving) by using at least the engine 12 as a power source. In this HV drive mode, in the differential mechanism 34, when the MG1 torque Tg that is a negative reaction torque generated by the first rotating machine MG1 is input to the sun gear S0 against the positive engine torque Te that is input to the carrier CA0, an engine direct torque Td (=Te/(1+ρ0)=−(1/ρ0)×Tg) that is a positive torque in forward rotation appears in the ring gear R0. In accordance with a required driving force, a torque resulting from the engine direct torque Td and the MG2 torque Tm is transmitted to the drive wheels 14 as a forward driving torque of the vehicle 10 via the step transmission unit 22 in which any one of the AT first gear stage, the AT second gear stage, the AT third gear stage, and the AT fourth gear stage is established. The first rotating machine MG1 functions as a generator when the first rotating machine MG1 generates a negative torque in forward rotation. A generated power Wg of the first rotating machine MG1 is charged into the battery 54 or consumed by the second rotating machine MG2. The second rotating machine MG2 outputs an MG2 torque Tm by using the entire or part of the generated power Wg or by using an electric power from the battery 54 in addition to the generated power Wg.

The line L0*m* represented by the alternate long and short dashed line in FIG. 3 and the lines L1, L2, L3, L4 represented by the continuous lines in FIG. 3 respectively indicate the relative speeds of the rotating elements in forward running in EV drive mode in which the vehicle 10 is able to perform motor driving (EV driving) by using at least one of the first rotating machine MG1 and the second rotating machine MG2 as a power source in a state where the operation of the engine 12 is stopped. EV driving in forward running in EV drive mode includes, for example, single-motor EV driving that the vehicle 10 runs by using only the second rotating machine MG2 as a power source and double-motor EV driving that the vehicle 10 runs by using both the first rotating machine MG1 and the second rotating machine MG2 as a power source. In single-motor EV driving, the rotation of the carrier CA0 is set to zero, and an MG2 torque Tm that is a positive torque in forward rotation is input to the ring gear R0. At this time, the first rotating machine MG1 coupled to the sun gear S0 is placed in a no load state and is caused to idle in reverse rotation. In single-motor EV driving, the one-way clutch F0 is released, and the coupling shaft 30 is not locked to the case 18. In double-motor EV driving, when an MG1 torque Tg that is a negative torque in reverse rotation is input to the sun gear S0 in a state where the rotation of the carrier CA0 is set to zero, the one-way clutch F0 is automatically engaged such that the rotation of the carrier CA0 in the reverse rotation direction is stopped. In a state where the carrier CA0 is locked so as not to rotate by the engagement of the one-way clutch F0, a reaction torque from the MG1 torque Tg is input to the ring gear R0. In addition, in double-motor EV driving, as well as single-motor EV driving, an MG2 torque Tm is input to the ring gear R0. At the time when an MG1 torque Tg that is a negative torque in reverse rotation is input to the sun gear S0 in a state where the rotation of the carrier CA0 is set to zero, single-motor EV driving using the MG1 torque Tg is enabled when no MG2 torque Tm is input. In forward running in EV drive mode, the engine 12 is not driven, and an engine rotation speed Ne that is the rotation speed of the engine 12 is set to zero, and at least one of the MG1 torque Tg and the MG2 torque Tm is transmitted to the drive wheels 14 as a forward driving torque of the vehicle 10 via the step transmission unit 22 in which any one of the AT first gear stage, the AT second gear stage, the AT third gear stage, and the AT fourth gear stage is established. In forward running in EV drive mode, an MG1 torque Tg is a power running torque that is a negative torque in reverse rotation, and an MG2 torque Tm is a power running torque that is a positive torque in forward rotation.

The line L0R and the line LR, represented by the dashed lines in FIG. 3, respectively indicate the relative speeds of the rotating elements in reverse running in EV drive mode. In this reverse running in EV drive mode, an MG2 torque Tm that is a negative torque in reverse rotation is input to the ring gear R0, and the MG2 torque Tm is transmitted to the drive wheels 14 as a reverse driving torque of the vehicle 10 via the step transmission unit 22 in which the AT first gear stage is established. The electronic control unit 90 (described later) causes the second rotating machine MG2 to output a reverse MG2 torque Tm of which the sign is opposite from a forward MG2 torque Tm in forward running in a state where, for example, the AT first gear stage that is a forward low-side AT gear stage among the multiple AT gear stages is established, so the vehicle 10 is able to perform reverse running. In reverse running in EV drive mode, an MG2 torque Tm is a power running torque that is a negative torque in reverse rotation. In HV drive mode as well, the second rotating machine MG2 is enabled to be placed in reverse rotation as in the case of the line L0R, so the vehicle 10 is able to perform reverse running as in the case of the EV drive mode.

In the powertrain 16, the continuously variable transmission unit 20 includes the differential mechanism 34. The differential mechanism 34 includes three rotating elements, that is, the carrier CA0, the sun gear S0, and the ring gear R0. The carrier CA0 serves as the first rotating element RE1 coupled to the engine 12 such that power can be transmitted. The sun gear S0 serves as the second rotating element RE2 coupled to the first rotating machine MG1 such that power can be transmitted. The ring gear R0 serves as the third rotating element RE3 to which the intermediate transmission member 32 is coupled. The continuously variable transmission unit 20 serves as an electrical transmission mechanism in which the differential state of the differential mechanism 34 is controlled by controlling the operating status of the first rotating machine MG1. The third rotating element RE3 to which the intermediate transmission member 32 is coupled is the third rotating element RE3 to which the second rotating machine MG2 is coupled such that power can be transmitted, from another viewpoint. In other words, the powertrain 16 includes the continuously variable transmission unit 20 that includes the differential mechanism 34 coupled to the engine 12 such that power can be transmitted and the first rotating machine MG1 coupled to the differential mechanism 34 such that power can be transmitted. In the continuously variable transmission unit 20, the differential state of the differential mechanism 34 is controlled by controlling the operating status of the first rotating machine MG1. The continuously variable transmission unit 20 is operated as an electrical continuously variable transmission in which a speed ratio γ0 (=Ne/Nm) is changed. The speed ratio γ0 is the value of the ratio between the engine rotation speed Ne and the MG2 rotation speed Nm. The engine rotation speed Ne is equal to the rotation speed of the coupling shaft 30 that is the input rotating member. The MG2 rotation speed Nm is the rotation speed of the intermediate transmission member 32 that is the output rotating member.

For example, in HV drive mode, when the rotation speed of the sun gear S0 is raised or lowered by controlling the rotation speed of the first rotating machine MG1 against the rotation speed of the ring gear R0 bound for the rotation of the drive wheels 14 as a result of establishment of the AT gear stage in the step transmission unit 22, the rotation speed of the carrier CA0, that is, the engine rotation speed Ne, is raised or lowered. Therefore, in HV driving, the engine 12 can be operated at a highly efficient engine operating point. The engine operating point is the operating point of the engine 12, which is represented by the engine rotation speed Ne and the engine torque Te. In the powertrain 16, the step transmission unit 22 in which any one of the AT gear stages is established and the continuously variable transmission unit 20 that is operated as a continuously variable transmission make up a continuously variable transmission as the combined transmission 40 as a whole in which the continuously variable transmission unit 20 and the step transmission unit 22 are arranged in series.

The continuously variable transmission unit 20 is enabled to shift speeds like a step transmission. Therefore, in the powertrain 16, the step transmission unit 22 in which any one of the AT gear stages is established and the continuously variable transmission unit 20 that shifts speeds like a step transmission unit are able to shift speeds like a step transmission as the combined transmission 40 as a whole. In other words, in the combined transmission 40, it is possible to control the step transmission unit 22 and the continuously variable transmission unit 20 such that multiple gear stages having different speed ratios γt (=Ne/No) that indicate the values of the ratio of the engine rotation speed Ne to the output rotation speed No are selectively established. In the present embodiment, a gear stage that is established in the combined transmission 40 is referred to as simulated gear stage. A speed ratio γt is a total speed ratio that is established by the continuously variable transmission unit 20 and the step transmission unit 22, disposed in series, and is a value (γt=γ0×γat) obtained by multiplying the speed ratio γ0 of the continuously variable transmission unit 20 by the speed ratio γat of the step transmission unit 22.

For example, one or multiple simulated gear stages are assigned to each of the AT gear stages of the step transmission unit 22 so as to be established by combinations of the AT gear stages of the step transmission unit 22 and one or multiple speed ratios γ0 of the continuously variable transmission unit 20. For example, a simulated first gear stage, a simulated second gear stage, and a simulated third gear stage are determined in advance so as to be established for the AT first gear stage, a simulated fourth gear stage, a simulated fifth gear stage, and a simulated sixth gear stage are determined in advance so as to be established for the AT second gear stage, a simulated seventh gear stage, a simulated eighth gear stage, and a simulated ninth gear stage are determined in advance so as to be established for the AT third gear stage, and a simulated tenth gear stage is determined in advance so as to be established for the AT fourth gear stage. In the combined transmission 40, a different simulated gear stage in an AT gear stage is established by controlling the continuously variable transmission unit 20 such that the engine rotation speed Ne that achieves a predetermined speed ratio γt for the output rotation speed No is obtained. In the combined transmission 40, a simulated gear stage is changed by controlling the continuously variable transmission unit 20 in synchronization with a change of an AT gear stage.

Referring back to FIG. 1, the vehicle 10 includes the electronic control unit 90 serving as a controller including a controller of the vehicle 10 concerned with control over the engine 12, the continuously variable transmission unit 20, the step transmission unit 22, and the like. Thus, FIG. 1 is a diagram that shows input and output lines of the electronic control unit 90 and is a functional block diagram that illustrates a relevant part of control functions implemented by the electronic control unit 90. The electronic control unit 90 includes a so-called microcomputer including, for example, a CPU, RAM, ROM, input and output interfaces, and other components. The CPU executes various control on the vehicle 10 by processing signals in accordance with programs stored in the ROM in advance while using the temporary storage function of the RAM. The electronic control unit 90 is configured to, where necessary, separately include a computer for engine control, a computer for rotating machine control, a computer for hydraulic control, and the like.

Various signals and the like based on detected values of various sensors and the like provided in the vehicle 10 are supplied to the electronic control unit 90. The various sensors and the like include, for example, an engine rotation speed sensor 70, an output rotation speed sensor 72, an MG1 rotation speed sensor 74, an MG2 rotation speed sensor 76, an accelerator operation amount sensor 78, a throttle valve opening degree sensor 80, a battery sensor 82, a fluid temperature sensor 84, and the like. The various signals and the like include, for example, an engine rotation speed Ne, an output rotation speed No corresponding to a vehicle speed V, an MG1 rotation speed Ng that is the rotation speed of the first rotating machine MG1, an MG2 rotation speed Nm equal to an AT input rotation speed Ni, an accelerator operation amount θacc that is a driver's accelerator operation amount indicating the magnitude of driver's accelerator operation, a throttle valve opening degree θth that is the opening degree of an electronic throttle valve, a battery temperature THbat, battery charge/discharge current Ibat, and battery voltage Vbat of the battery 54, a hydraulic fluid temperature THoil that is the temperature of hydraulic fluid OIL, and the like.

Various command signals are output from the electronic control unit 90 to devices provided in the vehicle 10. The devices include, for example, the engine controller 50, the inverter 52, the hydraulic control circuit 56, the motor 62, and the like. The various command signals include, for example, an engine control command signal Se for controlling the engine 12, a rotating machine control command signal Smg for controlling the first rotating machine MG1 and the second rotating machine MG2, a hydraulic control command signal Sat for controlling the operation statuses of the engagement devices CB, an EOP control command signal Seop for controlling the operation status of the EOP 60, and the like.

Figure 4:
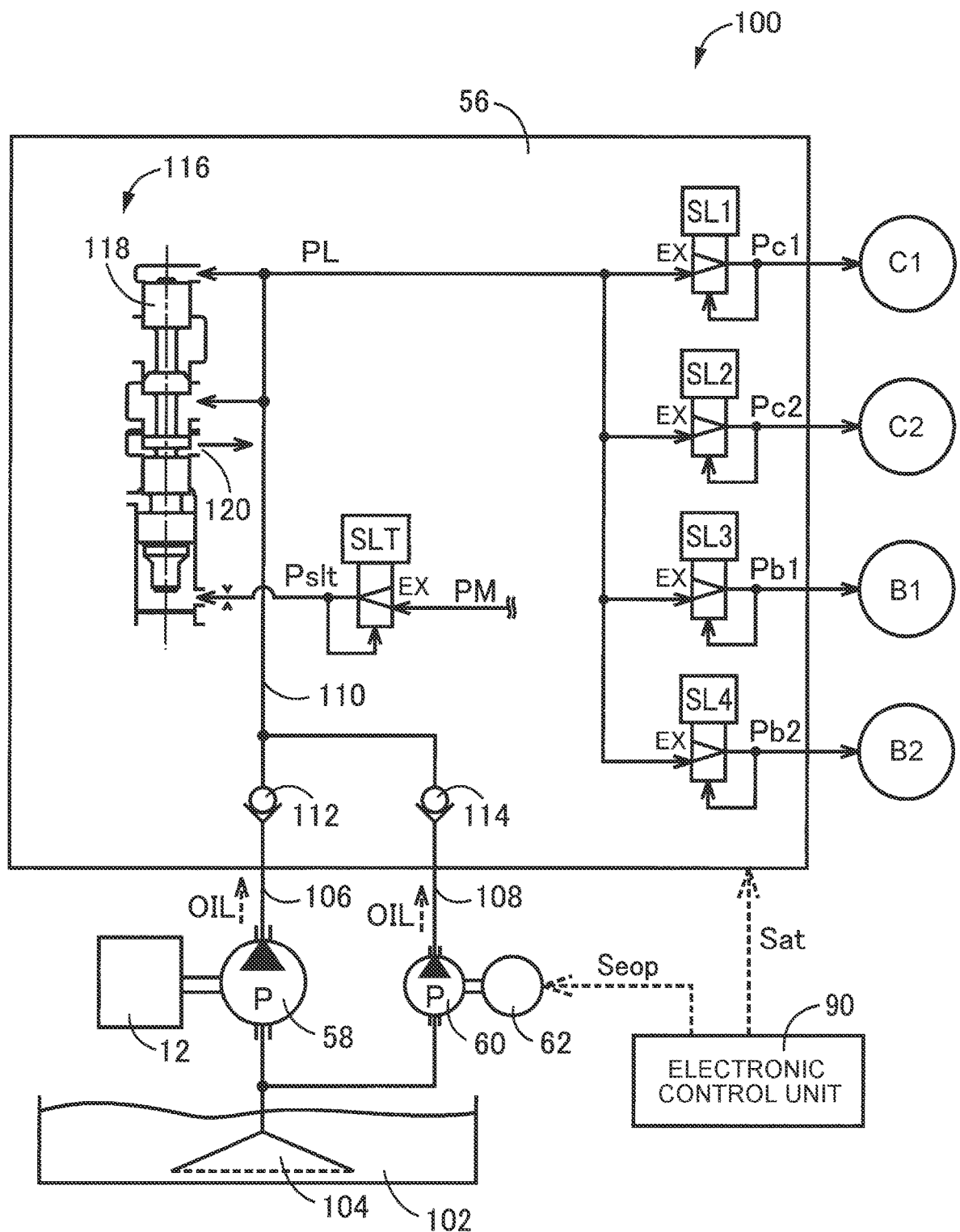
FIG. 4 is a diagram that illustrates a hydraulic control circuit and also a diagram that illustrates a hydraulic supply system including a hydraulic pressure source that supplies hydraulic fluid to a hydraulic control circuit, an electronic control unit that controls the hydraulic control circuit and the like, and other components.

FIG. 4 is a diagram that illustrates the hydraulic control circuit 56 and also a diagram that illustrates the hydraulic supply system 100 including a hydraulic pressure source that supplies hydraulic fluid OIL to the hydraulic control circuit 56, the electronic control unit 90 that controls the hydraulic control circuit 56 and the like, and other components. As shown in FIG. 4, the hydraulic supply system 100 includes the hydraulic control circuit 56, the MOP 58, the EOP 60, the motor 62, the electronic control unit 90, an oil pan 102, a strainer 104, discharge fluid passages 106, 108, and the like.

The MOP 58 and the EOP 60 are provided in parallel from the viewpoint of the configuration of fluid passages through which hydraulic fluid OIL flows. Each of the MOP 58 and the EOP 60 discharges hydraulic fluid OIL that is a source of hydraulic pressure for changing the operation statuses of the engagement devices CB or supplying lubricating oil to portions of the powertrain 16. Each of the MOP 58 and the EOP 60 draws via the strainer 104 hydraulic fluid OIL returned to the oil pan 102 and discharges the hydraulic fluid OIL to an associated one of the discharge fluid passages 106, 108. The oil pan 102 is provided at the bottom of the case 18. The strainer 104 is a common inlet port. The discharge fluid passages 106, 108 each are coupled to the fluid passage of the hydraulic control circuit 56, for example, a line pressure fluid passage 110 that is a fluid passage through which a line pressure PL is applied. The discharge fluid passage 106 to which hydraulic fluid OIL is discharged from the MOP 58 is coupled to the line pressure fluid passage 110 via an MOP check valve 112 provided in the hydraulic control circuit 56. The discharge fluid passage 108 to which hydraulic fluid OIL is discharged from the EOP 60 is coupled to the line pressure fluid passage 110 via an EOP check valve 114 provided in the hydraulic control circuit 56. The MOP 58 rotates integrally with the engine 12 and is driven for rotation by the engine 12 to generate the hydraulic pressure of hydraulic fluid OIL. The EOP 60 is driven for rotation by the motor 62 to generate the hydraulic pressure of hydraulic fluid OIL irrespective of the rotation status of the engine 12. The electronic control unit 90 outputs the EOP control command signal Seop to the motor 62 so as to control the operation status of the EOP 60.

The hydraulic control circuit 56 further includes a regulator valve 116, solenoid valves SLT, SL1, SL2, SL3, SL4, and the like in addition to the line pressure fluid passage 110, the MOP check valve 112, and the EOP check valve 114.

The regulator valve 116 regulates the line pressure PL by using hydraulic fluid OIL discharged from at least one of the MOP 58 and the EOP 60 as a source. The solenoid valve SLT is, for example, a linear solenoid valve and is controlled by the electronic control unit 90 so as to output a pilot pressure Pslt to the regulator valve 116. In the regulator valve 116, a spool 118 is urged by the pilot pressure Pslt, and the spool 118 is moved in an axial direction with a change in the opening area of a drain port 120, with the result that the line pressure PL is regulated in accordance with the pilot pressure Pslt. A source pressure that is input to the solenoid valve SLT is, for example, a modulator pressure PM regulated to a set value by a modulator valve (not shown) by using the line pressure PL as a source pressure. Hydraulic fluid OIL drained through the drain port 120 is used as, for example, lubricating oil that lubricates portions of the powertrain 16 and then returned to the oil pan 102.

The solenoid valves SL1, SL2, SL3, SL4 all are, for example, linear solenoid valves and are controlled by the electronic control unit 90 so as to respectively output the engagement hydraulic pressures PRcb of the engagement devices CB by using the line pressure PL supplied via the line pressure fluid passage 110 as a source pressure. The solenoid valve SL1 regulates a C1 hydraulic pressure Pc1 to be supplied to a hydraulic actuator of the clutch C1. The solenoid valve SL2 regulates a C2 hydraulic pressure Pc2 to be supplied to a hydraulic actuator of the clutch C2. The solenoid valve SL3 regulates a B1 hydraulic pressure Pb1 to be supplied to a hydraulic actuator of the brake B1. The solenoid valve SL4 regulates a B2 hydraulic pressure Pb2 to be supplied to a hydraulic actuator of the brake B2. The electronic control unit 90 includes a driver circuit that drives the solenoid valves SL1, SL2, SL3, SL4. The electronic control unit 90 sets PCB command pressures that are hydraulic pressure command values for the solenoid valves SL1, SL2, SL3, SL4, corresponding to the values of the hydraulic pressures Pc1, Pc2, Pb1, Pb2, and outputs driving currents or driving voltages for the PCB command pressures via the driver circuit to the hydraulic control circuit 56. The electronic control unit 90 outputs the hydraulic control command signal Sat for driving the solenoid valves SL1, SL2, SL3, SL4 so as to adjust the engagement torque Tcb of each engagement device CB by using the line pressure PL as a source pressure.

It is desirable that the line pressure PL be set to a hydraulic pressure with which the solenoid valves SL1, SL2, SL3, SL4 are able to respectively appropriately output the engagement hydraulic pressures PRcb that provide the required transmission torques Tcbn of the engagement devices CB. It is desirable that the line pressure PL be a hydraulic pressure as low as possible from the viewpoint of improvement in fuel efficiency. For this reason, the line pressure PL just needs to be a minimum line pressure PL within the range of the line pressure PL with which the solenoid valves SL1, SL2, SL3, SL4 are able to respectively appropriately output the engagement hydraulic pressures PRcb that provide the required transmission torques Tcbn. In the present embodiment, the minimum line pressure PL is referred to as required line pressure PLn. The electronic control unit 90 includes a driver circuit that drives the solenoid valve SLT. The electronic control unit 90 sets a PL command pressure that is a hydraulic pressure command value for the solenoid valve SLT, corresponding to the value of the required line pressure PLn, in accordance with the required transmission torque Tcbn, that is, the AT input torque Ti or the like, and outputs a driving current or a driving voltage for the PL command pressure to the hydraulic control circuit 56 via the driver circuit. The electronic control unit 90 outputs the hydraulic control command signal Sat for driving the solenoid valve SLT so as to adjust the line pressure PL. Thus, the line pressure PL is set to a hydraulic pressure for the required transmission torque Tcbn, that is, the required line pressure PLn. In this way, the electronic control unit 90 sets the PL command pressure to a value for the required transmission torque Tcbn of each engagement device CB. The solenoid valve SLT outputs a pilot pressure Pslt for the PL command pressure to the regulator valve 116. The regulator valve 116 regulates the line pressure PL in accordance with the pilot pressure Pslt that is changed by the PL command pressure. A PL command pressure may be regarded as a hydraulic pressure command value for the regulator valve 116. The regulator valve 116 is a pressure regulating valve provided downstream of the MOP 58 and the EOP 60. The regulator valve 116 regulates the line pressure PL by opening the drain port 120 to reduce the hydraulic pressure of hydraulic fluid OIL, discharged from the MOP 58 and the EOP 60, in accordance with the PL command pressure. The electronic control unit 90 controls the pressure regulating operation of the regulator valve 116 by setting the PL command pressure.

Referring back to FIG. 1, the electronic control unit 90 includes an AT shift control unit 92 and a hybrid control unit 94 to implement various control in the vehicle 10.

Figure 5:
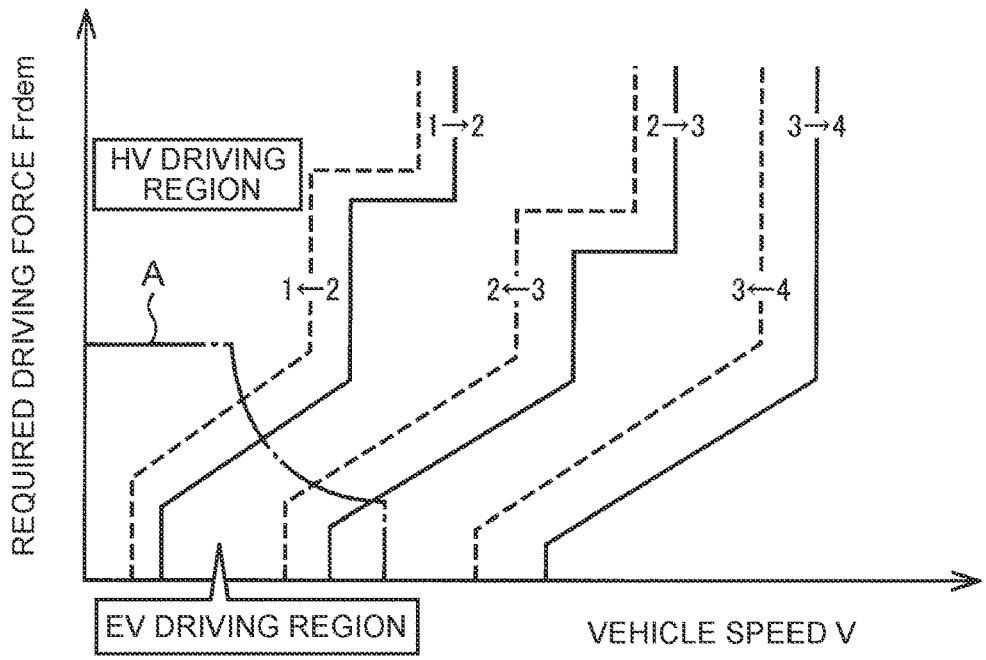
FIG. 5 is a view that shows an example of an AT gear stage shift map that is used in shift control over the step transmission unit and an example of a drive mode change map that is used in change control over a drive mode and that also shows concerned relationships.

The AT shift control unit 92 performs a shift determination of the step transmission unit 22 by using, for example, an AT gear stage shift map shown in FIG. 5 obtained by an experiment or designed in advance and stored, that is, a relationship determined in advance and, where necessary, outputs the hydraulic control command signal Sat for executing shift control over the step transmission unit 22 to the hydraulic control circuit 56. The AT gear stage shift map is, for example, a predetermined relationship having shift lines for determining a shift of the step transmission unit 22 on a two-dimensional coordinate system with vehicle speed V and required driving force Frdem as variables. An output rotation speed No or the like may be used instead of a vehicle speed V, and a required driving torque Trdem, an accelerator operation amount θacc, a throttle valve opening degree θth, or the like may be used instead of a required driving force Frdem. The shift lines in the AT gear stage shift map are upshift lines for determining an upshift as represented by the continuous lines and downshift lines for determining a downshift as represented by the dashed lines.

The hybrid control unit 94 includes the function of an engine control unit to control the operation of the engine 12 and the function of a rotating machine control unit to control the operation of the first rotating machine MG1 and the operation of the second rotating machine MG2 via the inverter 52. The hybrid control unit 94 executes hybrid drive control or the like by using the engine 12, the first rotating machine MG1, and the second rotating machine MG2 with those control functions.

The hybrid control unit 94 calculates a required driving force Frdem in the drive wheels 14 as a required driving amount by, for example, applying an accelerator operation amount θacc and a vehicle speed V to a required driving amount map that is a relationship determined in advance. Other than a required driving force Frdem [N], a required driving torque Trdem [Nm] in the drive wheels 14, a required driving power Prdem [W] in the drive wheels 14, a required AT output torque in the output shaft 24, or the like may be used as the required driving amount. The hybrid control unit 94 outputs the engine control command signal Se that is a command signal to control the engine 12 and the rotating machine control command signal Smg that is a command signal to control the first rotating machine MG1 and the second rotating machine MG2 such that a required driving power Prdem based on a required driving torque Trdem and a vehicle speed V is achieved in consideration of a chargeable power Win and dischargeable power Wout of the battery 54, and the like. The engine control command signal Se is, for example, a command value of engine power Pe that is the power of the engine 12 that outputs an engine torque Te at the engine rotation speed Ne at that time. The rotating machine control command signal Smg is, for example, a command value of generated power Wg of the first rotating machine MG1 that outputs an MG1 torque Tg at the MG1 rotation speed Ng at the time of output of the command that is a reaction torque for an engine torque Te and is a command value of consumed power Wm of the second rotating machine MG2 that outputs an MG2 torque Tm at the MG2 rotation speed Nm at the time of output of the command.

The chargeable power Win of the battery 54 is an inputtable power that defines the limit of input power of the battery 54. The dischargeable power Wout of the battery 54 is an outputtable power that defines the limit of output power of the battery 54. The chargeable power Win and dischargeable power Wout of the battery 54 are calculated by the electronic control unit 90 based on, for example, a battery temperature THbat and a state of charge SOC [%] of the battery 54. A state of charge SOC of the battery 54 is a value indicating a state of charge of the battery 54 and is calculated by the electronic control unit 90 based on, for example, a battery charge/discharge current Ibat, a battery voltage Vbat, and the like.

For example, when the continuously variable transmission unit 20 is caused to operate as a continuously variable transmission to cause the combined transmission 40 as a whole to operate as a continuously variable transmission, the hybrid control unit 94 controls the engine 12 and controls the generated power Wg of the first rotating machine MG1 such that the engine rotation speed Ne and the engine torque Te that provide the engine power Pe achieving the required driving power Prdem are obtained in consideration of an optimal engine operating point or the like, thus executing continuously variable shift control over the continuously variable transmission unit 20 to change the speed ratio γ0 of the continuously variable transmission unit 20. As a result of this control, the speed ratio γt of the combined transmission 40 in the case of being operated as a continuously variable transmission is controlled. The optimal engine operating point is determined in advance as an engine operating point at which total fuel efficiency in the vehicle 10 is the highest in consideration of charge/discharge efficiency and the like in the battery 54 in addition to the fuel efficiency of the engine 12 alone when, for example, the required engine power Pedem is achieved.

For example, when the continuously variable transmission unit 20 is caused to shift speeds like a step transmission to cause the combined transmission 40 as a whole to shift speeds like a step transmission, the hybrid control unit 94 performs a shift determination of the combined transmission 40 by using, for example, a simulated gear stage shift map that is a relationship determined in advance and executes shift control over the continuously variable transmission unit 20 such that multiple simulated gear stages are selectively established in coordination with shift control of the AT shift control unit 92 over the AT gear stage of the step transmission unit 22. The multiple simulated gear stages can be established by controlling the engine rotation speed Ne with the first rotating machine MG1 in accordance with the output rotation speed No such that the speed ratio γt of each of the multiple simulated gear stages is maintained. The speed ratio γt of each simulated gear stage is not necessarily a constant value over the entire range of the output rotation speed No and may be changed in a predetermined range or may be limited depending on an upper limit, a lower limit, or the like of the rotation speed of each component. In this way, the hybrid control unit 94 is capable of executing shift control that changes the engine rotation speed Ne like a step shift. Simulated step shift control that causes the combined transmission 40 as a whole to shift speeds like a step transmission may be executed in preference to continuously variable shift control that causes the combined transmission 40 as a whole to operate as a continuously variable transmission only, for example, when a driver selects a driving performance-oriented drive mode, such as a sport drive mode, or when the required driving torque Trdem is relatively large. Alternatively, simulated step shift control may be basically executed except when predetermined restrictions are set.

The hybrid control unit 94 selectively establishes the EV drive mode or the HV drive mode as a drive mode in accordance with a running status. For example, the hybrid control unit 94 establishes the EV drive mode when the required driving power Prdem falls within an EV drive region less than a predetermined threshold, and establishes the HV drive mode when the required driving power Prdem falls within an HV drive region greater than or equal to the predetermined threshold. The alternate long and short dashed line A in FIG. 5 is a boundary line between the HV drive region and the EV drive region for switching between the HV drive mode and the EV drive mode. A predetermined relationship having the boundary line as represented by the alternate long and short dashed line A in FIG. 5 is an example of a drive mode change map on a two-dimensional coordinate system with a vehicle speed V and a required driving force Frdem as variables. For the sake of convenience, FIG. 5 shows the drive mode change map together with the AT gear stage shift map.

When the hybrid control unit 94 establishes the EV drive mode, the hybrid control unit 94 causes the vehicle 10 to run in single-motor EV driving by using the second rotating machine MG2 when the required driving power Prdem is achieved by using only the second rotating machine MG2. On the other hand, when the hybrid control unit 94 establishes the EV drive mode, the hybrid control unit 94 causes the vehicle 10 to run in double-motor EV driving when the required driving power Prdem is not achieved by using only the second rotating machine MG2. Even when the required driving power Prdem is achieved by using only the second rotating machine MG2, but when using both the first rotating machine MG1 and the second rotating machine MG2 is more efficient than using only the second rotating machine MG2, the hybrid control unit 94 may cause the vehicle 10 to run in double-motor EV driving.

Even when the required driving power Prdem falls within the EV drive region, but when the state of charge SOC of the battery 54 is lower than a predetermined engine start threshold, when warm-up of the engine 12 is required, or other cases, the hybrid control unit 94 establishes the HV drive mode. The engine start threshold is a predetermined threshold for determining a state of charge SOC at which the battery 54 needs to be charged by forcibly starting the engine 12.

When the hybrid control unit 94 establishes the HV drive mode during a stop of operation of the engine 12, the hybrid control unit 94 executes engine start control that starts the engine 12. When the hybrid control unit 94 starts the engine 12, the hybrid control unit 94, for example, raises the engine rotation speed Ne with the first rotating machine MG1 and starts the engine 12 by ignition when the engine rotation speed Ne becomes higher than or equal to a predetermined ignitable rotation speed. In other words, the hybrid control unit 94 starts the engine 12 by cranking the engine 12 with the first rotating machine MG1.

For example, when the hybrid control unit 94 establishes the EV drive mode during operation of the engine 12 or the hybrid control unit 94 executes known start-stop control that temporarily stops the engine 12 because of the fact that the vehicle 10 has stopped during operation of the engine 12, the hybrid control unit 94 executes engine stop control that stops the engine 12. When the hybrid control unit 94 executes engine stop control, the hybrid control unit 94 stops supply of fuel to the engine 12. At this time, for example, in order to stop the rotation of the engine 12 by quickly passing through a resonant region in the engine rotation speed Ne, the hybrid control unit 94 controls the MG1 torque Tg such that a torque for lowering the engine rotation speed Ne is applied to the engine 12.

When, after a start of engine stop control, the engine rotation speed Ne decreases and the rotation of the engine 12 is stopped, no hydraulic fluid OIL is discharged from the MOP 58, so the EOP 60 is operated during a stop of the engine 12. In order to ensure the flow rate of hydraulic fluid OIL for only maintaining the required line pressure PLn, the electronic control unit 90 starts the operation of the EOP 60 from when the engine 12 is stopped, that is, when engine stop control is started, for example, during operation of the engine 12. In other words, at the time of stopping the engine 12, the electronic control unit 90 starts the operation of the EOP 60 from when the MOP 58 is able to discharge the flow rate of hydraulic fluid OIL sufficient to maintain the required line pressure PLn before the rotation of the engine 12 is stopped. The time when engine stop control is started corresponds to time when a decrease in the discharge flow rate of the MOP 58 is predicted.

Incidentally, in the process of engine stop control, the engine rotation speed Ne is quickly decreased, so the discharge flow rate of the MOP 58 is steeply reduced. Thus, in the regulator valve 116, the spool 118 is operated to close the drain port 120. In the regulator valve 116, the volume of a fluid chamber that receives a pilot pressure Pslt varies with such an operation of the spool 118, and the pilot pressure Pslt decreases because of occurrence of negative pressure. A delay in response occurs in the operation of the spool 118 for a steep reduction in the discharge flow rate of the MOP 58. Therefore, although hydraulic fluid OIL is discharged from both the MOP 58 and the EOP 60, that is, the flow rate of hydraulic fluid OIL for maintaining the required line pressure PLn is ensured in the process of engine stop control, such a phenomenon that an actual line pressure PL becomes lower than the required line pressure PLn occurs. In the present embodiment, an actual line pressure PL is referred to as PL actual pressure. For such a phenomenon, it is conceivable to, concurrently with the start of operation of the EOP 60, the PL command pressure is temporarily set to a value higher than a value corresponding to the required line pressure PLn, that is, a value for the required transmission torque Tcbn to forcibly operate the spool 118 to close the drain port 120. However, when the PL command pressure is set to a high pressure concurrently with the start of operation of the EOP 60, the EOP 60 is operated in a high PL actual pressure, so there are concerns that the durability of the EOP 60 deteriorates.

The electronic control unit 90 temporarily sets the PL command pressure to a value higher than a value for the required transmission torque Tcbn after a lapse of a predetermined period of time TMa from when the operation of the EOP 60 is started, and controls the regulator valve 116 such that the regulator valve 116 operates to close the drain port 120.

In order to implement the hydraulic supply system 100 that is capable of suppressing a decrease in PL actual pressure in the process of reduction of the flow rate of hydraulic fluid OIL discharged from the MOP 58 while reducing the deterioration of the durability of the EOP 60, the electronic control unit 90 further includes a status determination unit 96 and a hydraulic pressure decrease suppressing unit 98.

The status determination unit 96 determines whether the vehicle 10 is performing HV driving, that is, whether the vehicle 10 is performing engine driving. When the status determination unit 96 determines that the vehicle 10 is performing engine driving, the status determination unit 96 determines whether the engine 12 is stopped by the hybrid control unit 94, that is, whether engine stop control is started.

When the status determination unit 96 determines that engine stop control is started by the hybrid control unit 94, the hydraulic pressure decrease suppressing unit 98 starts the operation of the EOP 60.

The status determination unit 96 determines whether the predetermined period of time TMa has elapsed from when the operation of the EOP 60 is started by the hydraulic pressure decrease suppressing unit 98. The predetermined period of time TMa is, for example, a threshold determined in advance as a period of time from when the status determination unit 96 determines that engine stop control is started by the hybrid control unit 94 to when the PL actual pressure decreases below a predetermined pressure PLf. The predetermined pressure PLf is, for example, a PL actual pressure that should be obtained with a PL command pressure set to a value for the required transmission torque Tcbn or an upper limit of a PL actual pressure determined in advance to reduce the deterioration of the durability of the EOP 60.

When the degree of decrease in PL actual pressure resulting from a decrease in the discharge flow rate of the MOP 58 from when the operation of the EOP 60 is started varies, a period of time that is taken until the PL actual pressure decreases below the predetermined pressure PLf varies. The electronic control unit 90 sets the predetermined period of time TMa in accordance with the degree of decrease in PL actual pressure from when the PL actual pressure that has been temporarily in an increasing tendency switches to a decreasing tendency after the operation of the EOP 60 is started. As the degree of decrease in PL actual pressure increases, a period of time that is taken until the PL actual pressure decreases below the predetermined pressure PLf becomes shorter. The electronic control unit 90 shortens the predetermined period of time TMa when the degree of decrease in PL actual pressure is high than when the degree of decrease in PL actual pressure is low. For example, a value detected by a hydraulic pressure sensor (not shown) provided in the hydraulic control circuit 56 is used as a PL actual pressure.

When the degree of decrease in the discharge flow rate of the MOP 58 varies, the degree of decrease in PL actual pressure after the operation of the EOP 60 is started varies. The electronic control unit 90 may set the predetermined period of time TMa in accordance with the degree of decrease in the discharge flow rate of the MOP 58 after the operation of the EOP 60 is started. As the degree of decrease in the discharge flow rate of the MOP 58 increases, a period of time that is taken until the PL actual pressure decreases below the predetermined pressure PLf is shortened. The electronic control unit 90 shortens the predetermined period of time TMa when the degree of decrease in the discharge flow rate of the MOP 58 is high than when the degree of decrease in the discharge flow rate of the MOP 58 is low. The degree of decrease in the discharge flow rate of the MOP 58 is proportional to the degree of decrease in the engine rotation speed Ne. The electronic control unit 90 uses, for example, the degree of decrease in the engine rotation speed Ne as the degree of decrease in the discharge flow rate of the MOP 58.

When the discharge flow rate of the MOP 58 at the time when the operation of the EOP 60 is started is large, that is, when the engine rotation speed Ne is high, a period of time that is taken until the PL actual pressure decreases below the predetermined pressure PLf varies. The electronic control unit 90 may set the predetermined period of time TMa in accordance with the discharge flow rate of the MOP 58, that is, the engine rotation speed Ne, at the time when the operation of the EOP 60 is started.

When the hydraulic fluid temperature THoil varies, the degree of decrease in PL actual pressure from when the operation of the EOP 60 is started varies. For example, as the hydraulic fluid temperature THoil decreases relative to a normal temperature range, the response of the pressure regulating operation of the regulator valve 116 deteriorates, drain of hydraulic fluid OIL from the drain port 120 becomes faster because of a delay in response to close the drain port 120, and the degree of decrease in PL actual pressure increases. When the hydraulic fluid temperature THoil is an extremely low temperature, the viscosity of hydraulic fluid OIL increases and, as a result, the rate of drain of hydraulic fluid OIL from the drain port 120 decreases, so the degree of decrease in PL actual pressure is decreased. The electronic control unit 90 may set the predetermined period of time TMa in accordance with the hydraulic fluid temperature THoil.

When the status determination unit 96 determines that the predetermined period of time TMa has elapsed from when the operation of the EOP 60 is started, that is, after a lapse of the predetermined period of time TMa, the hydraulic pressure decrease suppressing unit 98 executes hydraulic pressure command increasing control (=hydraulic pressure command up control) that sets the PL command pressure to a predetermined value PLup higher than a value for the required transmission torque Tcbn. The predetermined value PLup is a PL command pressure higher by a command pressure up amount $\Delta$PL than a value for the required transmission torque Tcbn and is a value determined in advance to, for example, make the PL actual pressure difficult to decrease below a PL actual pressure that should be obtained with a PL command pressure set to a value for the required transmission torque Tcbn. In other words, the predetermined value PLup is a value determined in advance to ensure the response of the pressure regulating operation of the regulator valve 116 to close the drain port 120. As described above, depending on a difference in hydraulic fluid temperature THoil, the response of the pressure regulating operation of the regulator valve 116 and the rate of drain of hydraulic fluid OIL from the drain port 120 vary. The electronic control unit 90 may set the command pressure up amount $\Delta$PL in accordance with, for example, a hydraulic fluid temperature THoil. In other words, the electronic control unit 90 may set the predetermined value PLup in accordance with a hydraulic fluid temperature THoil. When the PL command pressure varies, easiness of a decrease in PL actual pressure that should be obtained with a PL command pressure may vary. Because the PL command pressure is changed in accordance with the required transmission torque Tcbn, the electronic control unit 90 may set the command pressure up amount $\Delta$PL in accordance with, for example, the required transmission torque Tcbn. In other words, the electronic control unit 90 may set the predetermined value PLup in accordance with the required transmission torque Tcbn.

From the viewpoint of reducing the deterioration of fuel efficiency or the deterioration of the durability of the EOP 60, it is better that the command pressure up amount $\Delta$PL is set to a value as small as possible and the predetermined value PLup is set to a minimum PL command pressure. In hydraulic pressure command up control, the hydraulic pressure decrease suppressing unit 98 sets the PL command pressure to the predetermined value PLup and then gradually reduces the PL command pressure from the predetermined value PLup to a value for the required transmission torque Tcbn. For example, the hydraulic pressure decrease suppressing unit 98 gradually reduces the PL command pressure from the predetermined value PLup to a value for the required transmission torque Tcbn over a predetermined period of time TMb. The electronic control unit 90, as in the case of the viewpoint of setting the predetermined period of time TMa, sets the predetermined period of time TMb in accordance with a degree of decrease in engine rotation speed Ne from when hydraulic pressure command up control is started, an engine rotation speed Ne at the time when hydraulic pressure command up control is started, a hydraulic fluid temperature THoil, or the like.

The status determination unit 96 determines whether the predetermined period of time TMb has elapsed from when the hydraulic pressure decrease suppressing unit 98 starts hydraulic pressure command up control.

When the status determination unit 96 determines that the predetermined period of time TMb has elapsed from when hydraulic pressure command up control is started, that is, after a lapse of the predetermined period of time TMb, the hydraulic pressure decrease suppressing unit 98 terminates hydraulic pressure command up control, that is, cancels hydraulic pressure command up control.

Figure 6:
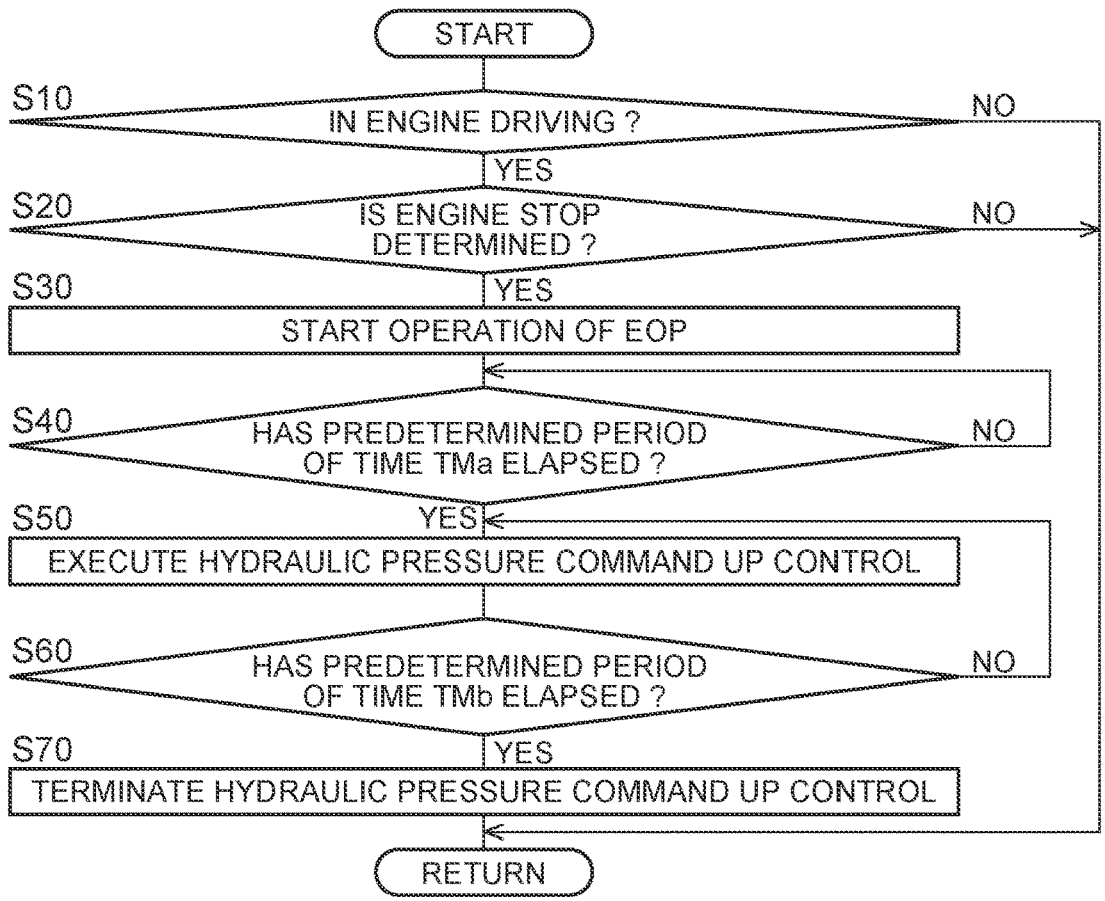
FIG. 6 is a flowchart that illustrates a relevant part of control operations of the electronic control unit and is a flowchart that illustrates control operations to implement the hydraulic supply system that is capable of suppressing a decrease in PL actual pressure in the process of reduction of the flow rate of hydraulic fluid discharged from an MOP while reducing deterioration of durability of an EOP.
Figure 7:
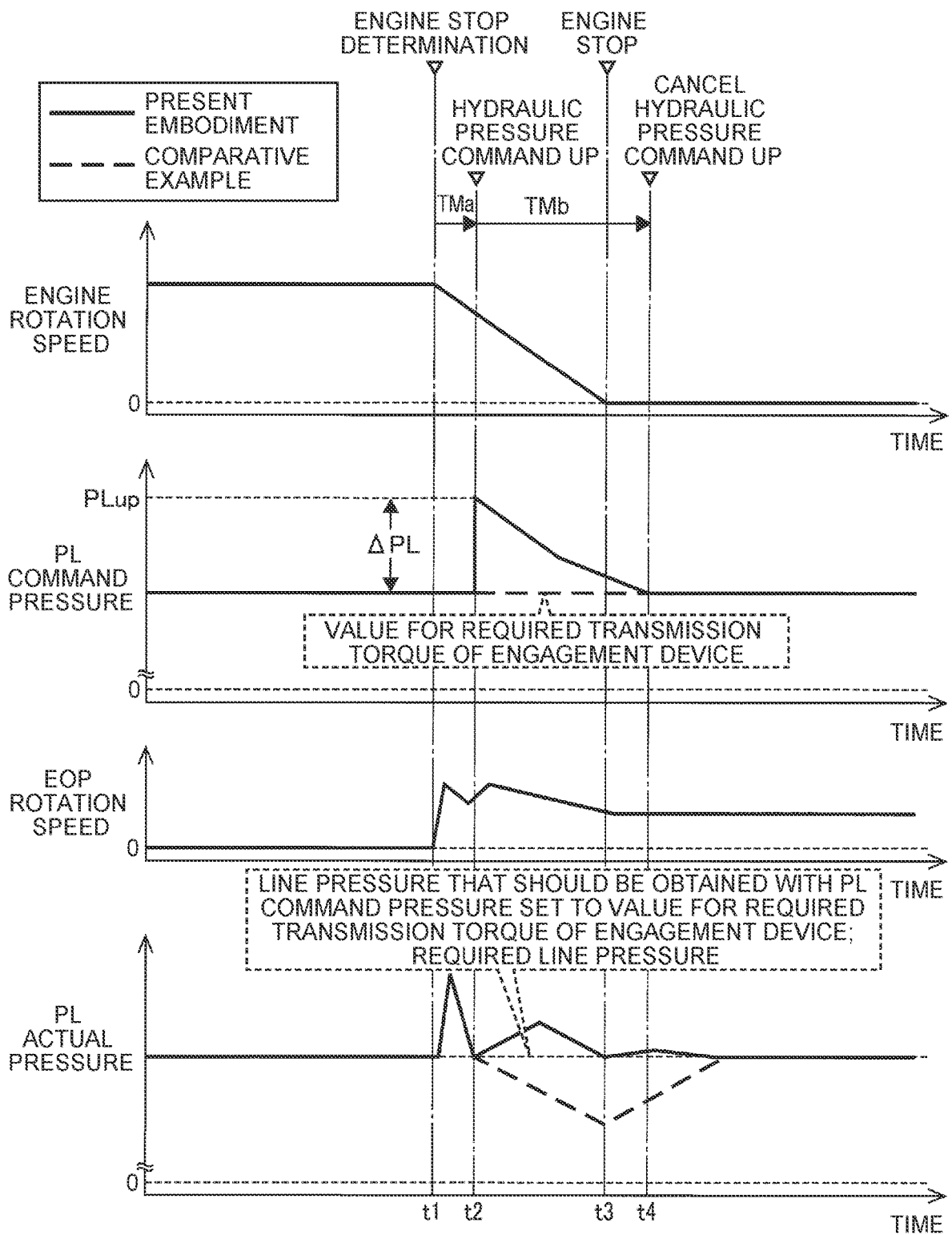
FIG. 7 is a view that shows an example of a timing chart when the control operations shown in the flowchart of FIG. 6 are executed.

FIG. 6 is a flowchart that illustrates a relevant part of control operations of the electronic control unit 90 and is a flowchart that illustrates control operations for implementing the hydraulic supply system 100 that is capable of suppressing a decrease in PL actual pressure in the process of reduction of the flow rate of hydraulic fluid OIL discharged from the MOP 58 while reducing the deterioration of the durability of the EOP 60. The flowchart is, for example, repeatedly executed. FIG. 7 is a view that shows an example of a timing chart when the control operations shown in the flowchart of FIG. 6 are executed.

In FIG. 6, initially, in step (hereinafter, step is omitted) S10 corresponding to the function of the status determination unit 96, it is determined whether the vehicle 10 is in engine driving. When negative determination is made in S10, the routine is ended. When affirmative determination is made in S10, it is determined in S20 corresponding to the function of the status determination unit 96 whether the engine 12 is stopped, that is, whether engine stop control is started. When negative determination is made in S20, the routine is ended. When affirmative determination is made in S20, the operation of the EOP 60 is started in S30 corresponding to the function of the hydraulic pressure decrease suppressing unit 98. Subsequently, in S40 corresponding to the function of the status determination unit 96, it is determined whether the predetermined period of time TMa has elapsed. When negative determination is made in S40, S40 is repeatedly executed. When affirmative determination is made in S40, hydraulic pressure command up control is executed in S50 corresponding to the function of the hydraulic pressure decrease suppressing unit 98. Subsequently, in S60 corresponding to the function of the status determination unit 96, it is determined whether the predetermined period of time TMb has elapsed. When negative determination is made in S60, the process is returned to S50. When affirmative determination is made in S60, hydraulic pressure command up control is terminated in S70 corresponding to the function of the hydraulic pressure decrease suppressing unit 98.

FIG. 7 is a view that shows an example of the case where the engine 12 is stopped during engine driving. In FIG. 7, time t1 indicates the time when a determination that the engine 12 is stopped is made during engine driving. The operation of the EOP 60 is started from time t1. In the operation of the EOP 60, the rotation speed of the EOP 60 is temporarily increased first to quickly raise the discharge pressure of hydraulic fluid OIL. The rotation speed of the EOP 60 is gradually decreased from the temporarily increased rotation speed to a target rotation speed. At this time, the rotation speed of the EOP 60 overshoots or undershoots as shown in the chart. In a comparative example represented by the dashed line, a PL command pressure is also set to a value for a required transmission torque Tcbn from time t1. Therefore, the PL actual pressure is once increased when the operation of the EOP 60 is started; however, the PL actual pressure is decreased with a decrease in engine rotation speed Ne (see time t1 to time t2), and furthermore a phenomenon that the PL actual pressure decreases below a required line pressure PLn occurs (see from time t2) because of a delay in response of the pressure regulating operation of the regulator valve 116 for a steep reduction in the discharge flow rate of the MOP 58 until the rotation of the engine 12 stops (see time t3). In the present embodiment represented by the continuous line, hydraulic pressure command up control is executed such that the PL actual pressure does not decrease below the required line pressure PLn. When hydraulic pressure command up control is executed concurrently with the start of operation of the EOP 60, the EOP 60 is operated in a high PL actual pressure state and, as a result, there are concerns that the durability of the EOP 60 deteriorates. Therefore, in the present embodiment, hydraulic pressure command up control is started after a lapse of the predetermined period of time TMa from the start of operation of the EOP 60 (see time t2). In hydraulic pressure command up control, the PL command pressure is set to the predetermined value PLup higher by the command pressure up amount ΔPL than a value for the required transmission torque Tcbn and then gradually reduced from the predetermined value PLup to a value for the required transmission torque Tcbn over the predetermined period of time TMb (see from time t2 to time t4). When the required transmission torque Tcbn changes during hydraulic pressure command up control, the PL command pressure may be changed with the change in hydraulic pressure command up control.

As described above, according to the present embodiment, the operation of the EOP 60 is started from when a decrease in the discharge flow rate of the MOP 58 is predicted. Therefore, even when the discharge flow rate of the MOP 58 becomes insufficient, a PL actual pressure that should be obtained with a PL command pressure set to a value for the required transmission torque Tcbn is more easily maintained. After a lapse of the predetermined period of time TMa from when the operation of the EOP 60 is started, the PL command pressure is temporarily set to a value higher than the value for the required transmission torque Tcbn, and the regulator valve 116 is controlled so as to operate to close the drain port 120. Therefore, the operation of the EOP 60 in a high PL actual pressure state is reduced, and a delay in response of the pressure regulating operation of the regulator valve 116 in the process of reduction of the flow rate of hydraulic fluid OIL discharged from the MOP 58 is reduced. Thus, it is possible to suppress a decrease in PL actual pressure in the process of reduction of the flow rate of hydraulic fluid OIL discharged from the MOP 58 while reducing the deterioration of the durability of the EOP 60.

According to the present embodiment, the predetermined pressure PLf is a PL actual pressure that should be obtained with a PL command pressure set to a value for the required transmission torque Tcbn, or an upper limit of a PL actual pressure determined in advance to reduce the deterioration of the durability of the EOP 60. Therefore, the operation of the EOP 60 in a high PL actual pressure state is appropriately reduced, and a delay in response of the pressure regulating operation of the regulator valve 116 in the process of reduction of the flow rate of hydraulic fluid OIL discharged from the MOP 58 is appropriately reduced.

According to the present embodiment, the predetermined period of time TMa is shortened when the degree of decrease in PL actual pressure from when the PL actual pressure that has been temporarily in an increasing tendency switches to a decreasing tendency after the operation of the EOP 60 is started is high than when the degree of decrease in PL actual pressure is low. Therefore, even when the degree of decrease in PL actual pressure from when the operation of the EOP 60 is started varies, the PL command pressure is more easily temporarily set to a higher value when the PL actual pressure is decreased below the predetermined pressure PLf. The predetermined period of time TMa is set in accordance with the hydraulic fluid temperature THoil. Therefore, even when the response of the pressure regulating operation of the regulator valve 116 or the rate of drain of hydraulic fluid OIL from the drain port 120 varies depending on a difference in hydraulic fluid temperature THoil and, as a result, the degree of decrease in PL actual pressure from when the operation of the EOP 60 is started varies, the PL command pressure is more easily temporarily set to a higher value when the PL actual pressure is decreased below the predetermined pressure PLf. The predetermined period of time TMa is shortened when the degree of decrease in the discharge flow rate of the MOP 58 from when the operation of the EOP 60 is started is high than when the degree of decrease in the discharge flow rate is low. Therefore, even when the degree of decrease in PL actual pressure from when the operation of the EOP 60 is started varies depending on a difference in the degree of decrease in the discharge flow rate of the MOP 58, the PL command pressure is more easily temporarily set to a higher value when the PL actual pressure is decreased below the predetermined pressure PLf. Thus, the operation of the EOP 60 in a high PL actual pressure state is appropriately reduced, and a delay in response of the pressure regulating operation of the regulator valve 116 in the process of reduction of the flow rate of hydraulic fluid OIL discharged from the MOP 58 is appropriately reduced.

According to the present embodiment, the PL command pressure is set to the predetermined value PLup higher than a value for the required transmission torque Tcbn after a lapse of the predetermined period of time TMa from when the operation of the EOP 60 is started, and then the PL command pressure is gradually reduced from the predetermined value PLup to the value for the required transmission torque Tcbn. Therefore, a delay in response of the pressure regulating operation of the regulator valve 116 in the process of reduction of the flow rate of hydraulic fluid OIL discharged from the MOP 58 is appropriately reduced, and the operation of the EOP 60 in a high PL actual pressure state is appropriately reduced.

According to the present embodiment, the predetermined value PLup is a value determined in advance to make the PL actual pressure difficult to decrease below a PL actual pressure that should be obtained with a PL command pressure set to a value for the required transmission torque Tcbn. Therefore, it is possible to appropriately suppress a decrease in PL actual pressure in the process of reduction of the flow rate of hydraulic fluid OIL discharged from the MOP 58.

The embodiments of the present disclosure are described in detail with reference the drawings; however, the present disclosure is also applicable to other embodiments.

For example, in the above-described embodiment, the MOP 58 that is a mechanical oil pump is illustrated as the first oil pump, and the EOP 60 that is an electric oil pump is illustrated as the second oil pump; however, the configuration is not limited thereto. For example, the first oil pump may be an electric oil pump. The second oil pump may be a mechanical oil pump. For example, the first oil pump may be an oil pump that is operated during running in a high load state where the required transmission torque Tcbn is relatively large, and the second oil pump may be an oil pump that is operated alone during running in a low load state where the required transmission torque Tcbn is relatively small. In addition, the second oil pump just needs to be the one of which the operation status is controllable by the electronic control unit 90. When the second oil pump is a mechanical oil pump, the second oil pump is, for example, coupled to one of the rotating members of the powertrain 16 via a clutch, and the operation status of the clutch is controlled to control the operation status of the second oil pump. The rotating member of the powertrain 16 is, for example, the output shaft 24, the ring gear of the differential gear unit 26, or the like.

In the above-described embodiment, to start the operation of the EOP 60 before the rotation of the engine 12 is stopped and when the MOP 58 is able to discharge the flow rate of hydraulic fluid OIL sufficient to maintain the required line pressure PLn, the time when the operation of the EOP 60 is started is set to the time when a decrease in the discharge flow rate of the MOP 58 is predicted, that is, the time when engine stop control is started; however, the configuration is not limited thereto. For example, the time when a decrease in the discharge flow rate of the MOP 58 is predicted may be the time when a request to shift into a vehicle state where the operation of the MOP 58 is stopped is made, the time when it is determined that the vehicle 10 is placed in a vehicle state that needs to stop the engine 12 before the start of engine stop control, or the like. The time when the operation of the EOP 60 is started may be the time when a decrease in the discharge flow rate of the MOP 58 is detected. The time when a decrease in the discharge flow rate of the MOP 58 is detected is the time when a decrease in the rotation speed of the MOP 58 is detected when the operation of the MOP 58 is stopped, the time when a decrease in the engine rotation speed Ne is detected after a stop of supply of fuel to the engine 12, or the like.

In the above-described embodiment, the vehicle 10 including the continuously variable transmission unit 20 and the step transmission unit 22 in series is illustrated as a vehicle to which the present disclosure is applied; however, the configuration is not limited thereto. For example, as long as a vehicle includes the hydraulic supply system including the first oil pump, the second oil pump of which the operation status is controllable, the regulator valve 116, the hydraulic engagement device of which the engagement torque Tcb is adjusted by using the line pressure PL as a source pressure, and the electronic control unit 90 that is capable of controlling the operation status of the second oil pump, the pressure regulating operation of the regulator valve 116, and the engagement torque Tcb, the present disclosure is applicable.

The above-described embodiments are only illustrative. The present disclosure may be implemented in modes including various modifications or improvements based on the knowledge of persons skilled in the art.

What is claimed is:
1. A hydraulic supply system comprising:
   a first oil pump;
   a second oil pump of which an operation status is controllable;
   a pressure regulating valve configured to regulate a line pressure by opening a drain port to reduce a hydraulic pressure of hydraulic fluid, discharged from the first oil pump and the second oil pump, in accordance with a hydraulic pressure command value; and a controller configured to control the operation status of the second oil pump, control a pressure regulating operation of the pressure regulating valve by setting the hydraulic pressure command value, and adjust a torque capacity of a hydraulic engagement device by using the line pressure as a source pressure, wherein the controller is configured to set the hydraulic pressure command value to a value for a required transmission torque of the hydraulic engagement device, and is configured to start an operation of the second oil pump from when a decrease in discharge flow rate of the first oil pump is predicted or when a decrease in the discharge flow rate of the first oil pump is detected and control the pressure regulating valve such that the pressure regulating valve operates to close the drain port by, after a lapse of a predetermined period of time, with which the line pressure becomes lower than a predetermined pressure, from when the operation of the second oil pump is started, temporarily setting the hydraulic pressure command value to a value higher than the value for the required transmission torque.

2. The hydraulic supply system according to claim 1, wherein the predetermined pressure is a line pressure that is obtained with the hydraulic pressure command value set to the value for the required transmission torque, or an upper limit of a line pressure, determined in advance to reduce deterioration of durability of the second oil pump.

3. The hydraulic supply system according to claim 1, wherein:

the controller is configured to set the predetermined period of time in accordance with a degree of decrease in the line pressure from when the line pressure that has been temporarily in an increasing tendency after the operation of the second oil pump is started switches to a decreasing tendency; and the controller is configured to shorten the predetermined period of time when the degree of decrease in the line pressure is high as compared to when the degree of decrease in the line pressure is low.

4. The hydraulic supply system according to claim 1, wherein the controller is configured to set the predetermined period of time in accordance with a temperature of the hydraulic fluid.

5. The hydraulic supply system according to claim 1, wherein:

the controller is configured to set the predetermined period of time in accordance with a degree of decrease in the discharge flow rate of the first oil pump from when the operation of the second oil pump is started; and the controller is configured to shorten the predetermined period of time when the degree of decrease in the discharge flow rate is high as compared to when the degree of decrease in the discharge flow rate is low.

6. The hydraulic supply system according to claim 1, wherein the controller is configured to, after a lapse of the predetermined period of time from when the operation of the second oil pump is started, set the hydraulic pressure command value to a predetermined value higher than the value for the required transmission torque and then gradually reduce the hydraulic pressure command value from the predetermined value to the value for the required transmission torque.

7. The hydraulic supply system according to claim 6, wherein the predetermined value is a value determined in advance to make the line pressure more difficult to decrease than a line pressure that is obtained with the hydraulic pressure command value set to the value for the required transmission torque.

* * * * *